(12) United States Patent
Suzuki

(10) Patent No.: US 12,439,014 B2
(45) Date of Patent: Oct. 7, 2025

(54) IMAGE PROCESSING SYSTEM, IMAGE PROCESSING APPARATUS, CONTROL METHOD OF IMAGE PROCESSING APPARATUS, AND STORAGE MEDIUM

(71) Applicant: CANON KABUSHIKI KAISHA, Tokyo (JP)

(72) Inventor: Motoharu Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 18/633,003

(22) Filed: Apr. 11, 2024

(65) Prior Publication Data
US 2024/0364852 A1  Oct. 31, 2024

(30) Foreign Application Priority Data
Apr. 28, 2023  (JP) .................................. 2023-074879

(51) Int. Cl.
| | |
|---|---|
| *H04N 13/111* | (2018.01) |
| *H04N 13/189* | (2018.01) |
| *H04N 13/282* | (2018.01) |
| *H04N 23/667* | (2023.01) |
| *H04N 23/90* | (2023.01) |

(52) U.S. Cl.
CPC ......... *H04N 13/111* (2018.05); *H04N 13/189* (2018.05); *H04N 13/282* (2018.05); *H04N 23/667* (2023.01); *H04N 23/90* (2023.01)

(58) Field of Classification Search
CPC .. H04N 13/111; H04N 13/189; H04N 13/282; H04N 23/667; H04N 23/90
USPC ............................................................ 348/48
See application file for complete search history.

(56) References Cited

U.S. PATENT DOCUMENTS

| | | | |
|---|---|---|---|
| 7,245,761 B2 * | 7/2007 | Swaminathan | ......... G06T 15/20 348/36 |
| 9,967,473 B2 * | 5/2018 | Takahashi | ............ H04N 23/633 |
| 10,628,956 B2 * | 4/2020 | Ikeda | ......................... G06T 7/70 |
| 10,855,967 B2 * | 12/2020 | Aizawa | ................ H04N 5/2628 |
| 11,282,265 B2 * | 3/2022 | Kobayashi | .............. G06T 15/30 |
| 11,330,295 B2 * | 5/2022 | Aflaki Beni | ......... H04N 23/698 |
| 11,688,299 B2 * | 6/2023 | Nagasaka | ................. G06F 9/44 |

(Continued)

FOREIGN PATENT DOCUMENTS

| | | | | |
|---|---|---|---|---|
| EP | 4408006 A1 * | 7/2024 | ............... | B60R 1/22 |
| JP | 2019050593 A | 3/2019 | | |
| JP | 2023003096 A | 1/2023 | | |

*Primary Examiner* — Helen Shibru
(74) *Attorney, Agent, or Firm* — Canon U.S.A., Inc., IP Division

(57) ABSTRACT

An image processing apparatus that supplies image data to an image processing system processing a plurality of pieces of image data that are based on a plurality of pieces of image capturing data acquires first image capturing data from an imaging unit configured to capture an image of an image capturing target. The image processing apparatus acquires second image capturing data from a storage unit storing the second image capturing data captured by the imaging unit. The image processing apparatus acquires image data by performing predetermined image processing on the acquired first image capturing data or the acquired second image capturing data in accordance with a setting of a mode. The image processing apparatus transmits the image data to an external device.

15 Claims, 10 Drawing Sheets

(56) References Cited

U.S. PATENT DOCUMENTS

| | | | |
|---|---|---|---|
| 11,689,703 B2* | 6/2023 | Pflug | H04N 13/15 |
| | | | 348/47 |
| 2013/0222656 A1* | 8/2013 | Kaneko | H04N 23/631 |
| | | | 348/262 |
| 2018/0130232 A1* | 5/2018 | Ito | G06T 7/174 |
| 2025/0047982 A1* | 2/2025 | Kawabata | H04N 23/698 |

* cited by examiner

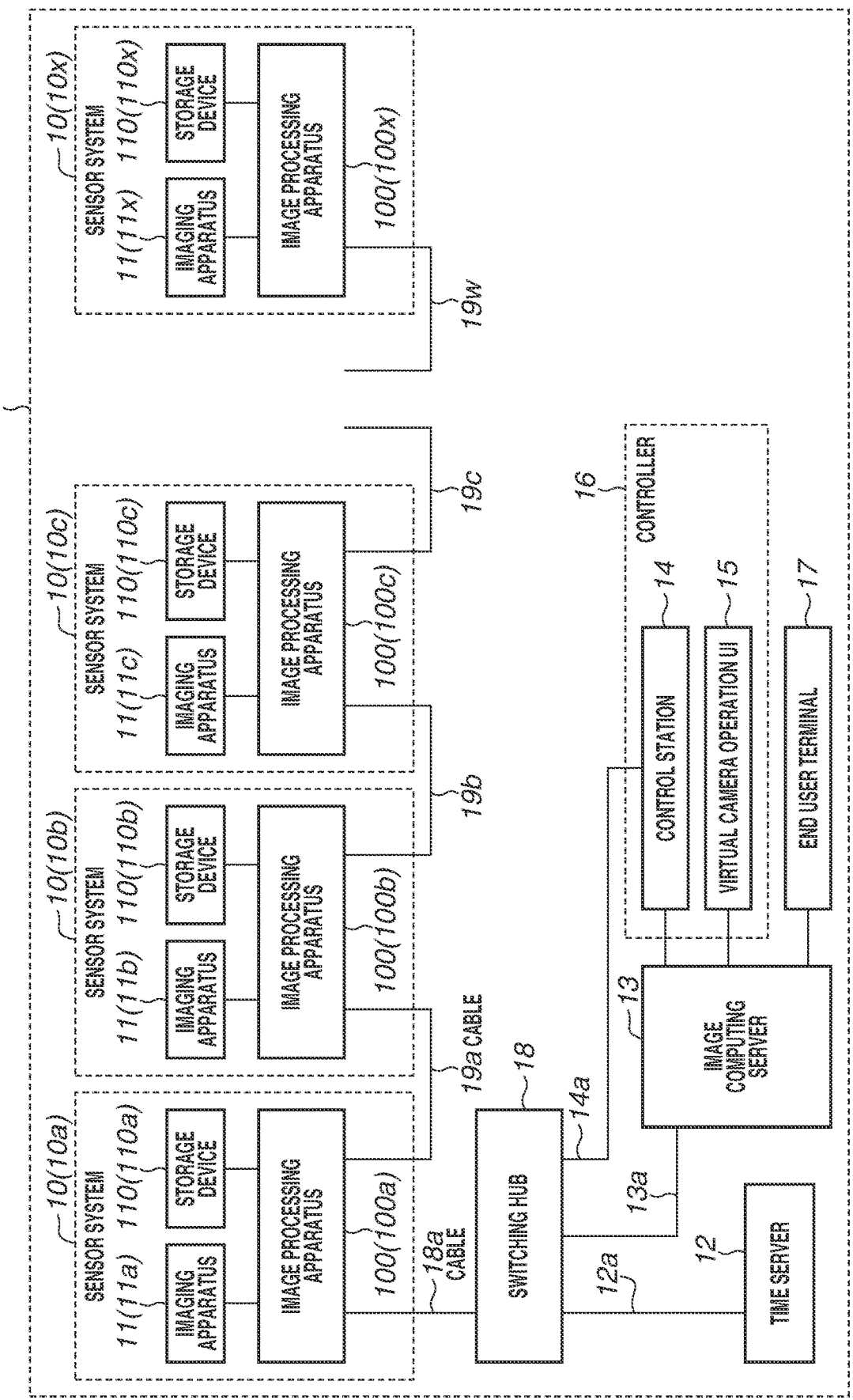

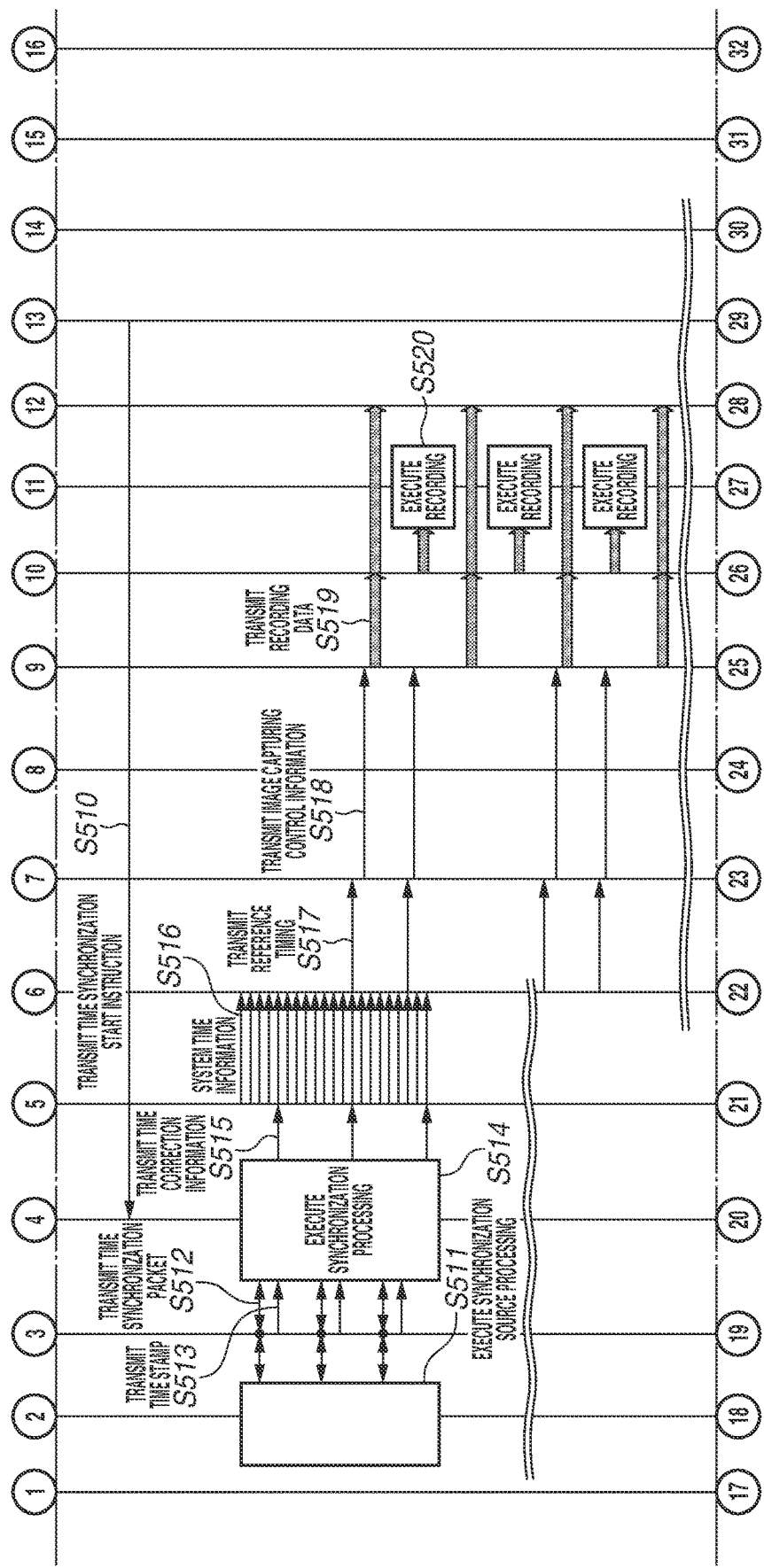

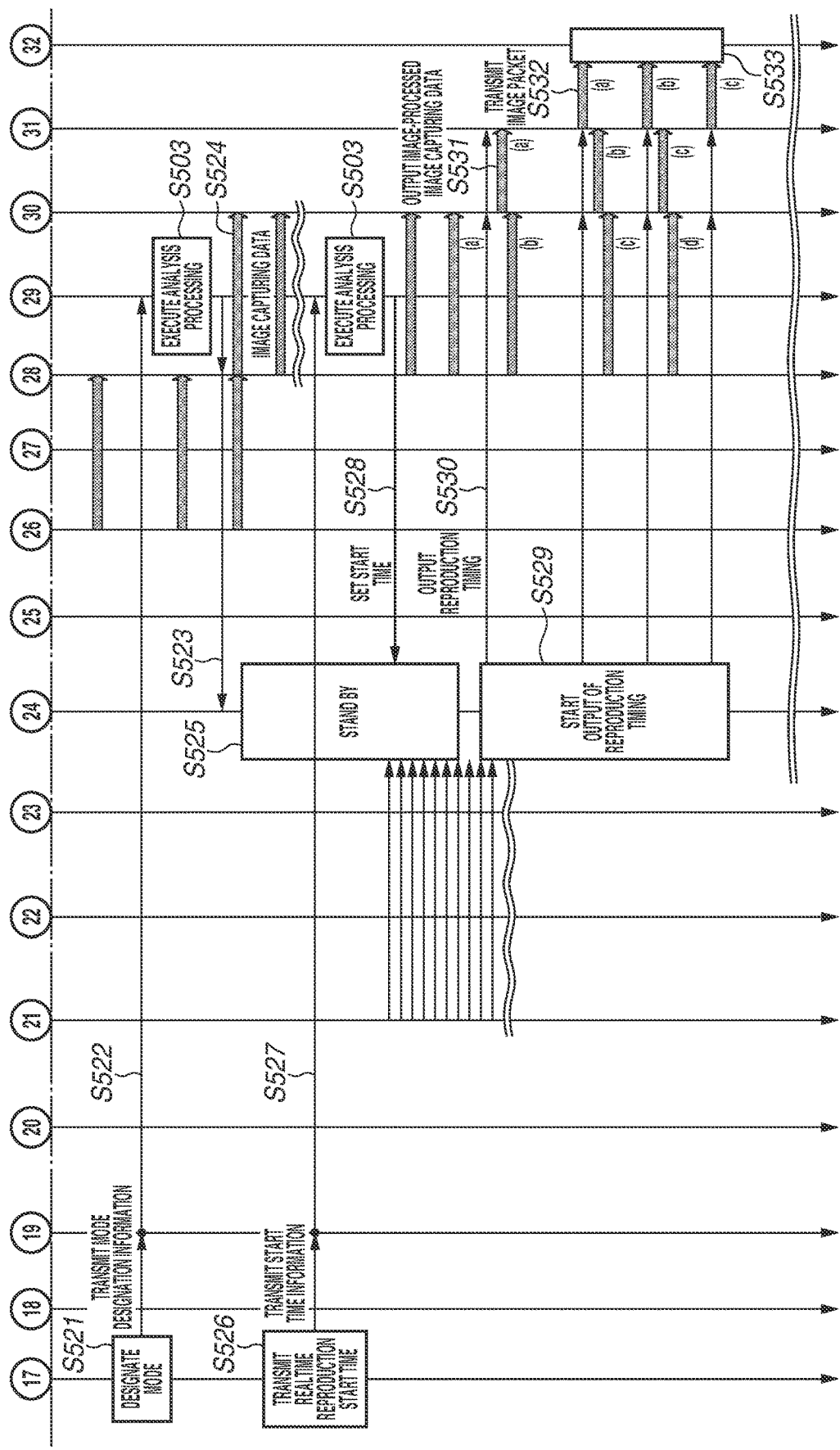

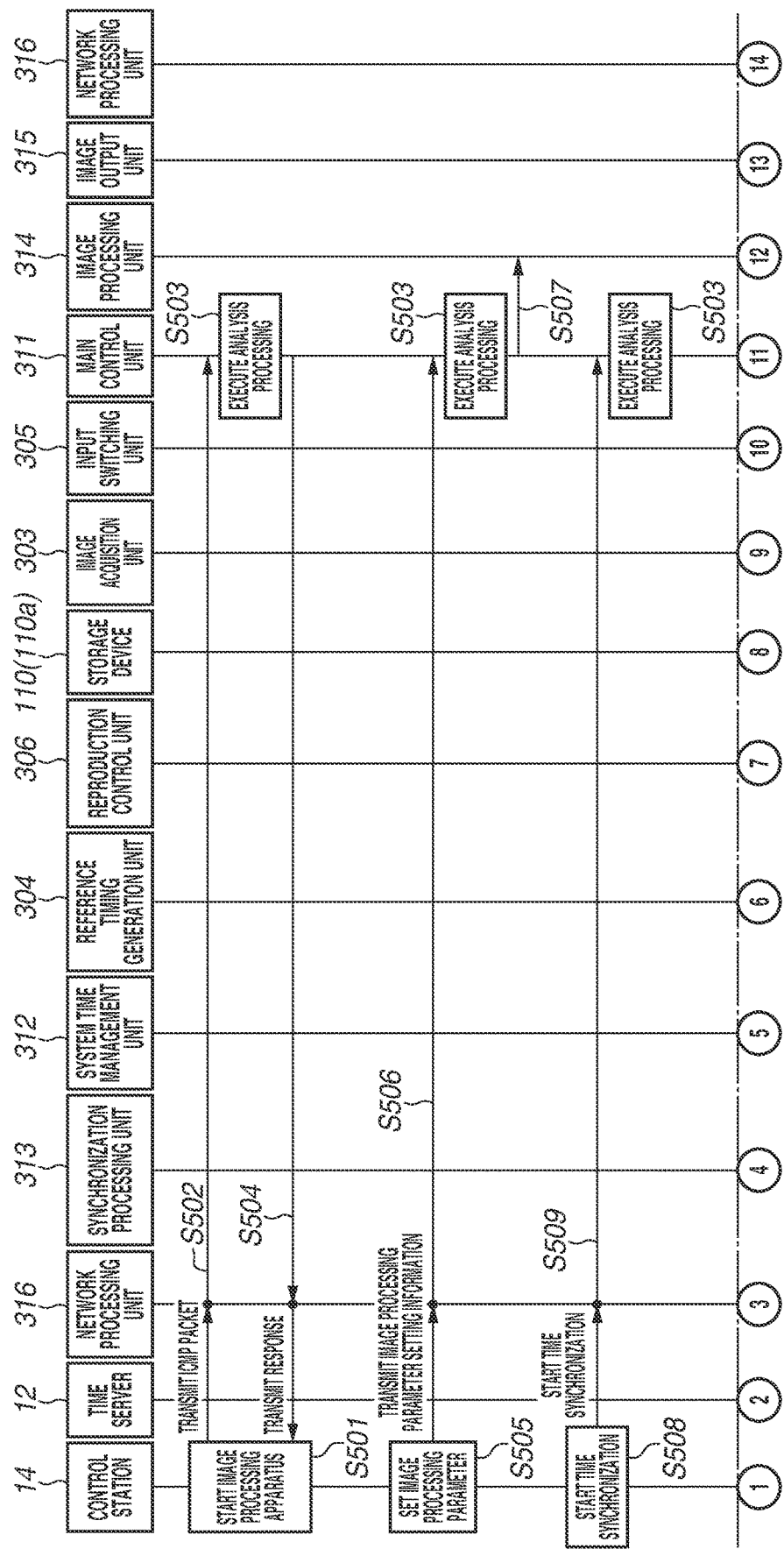

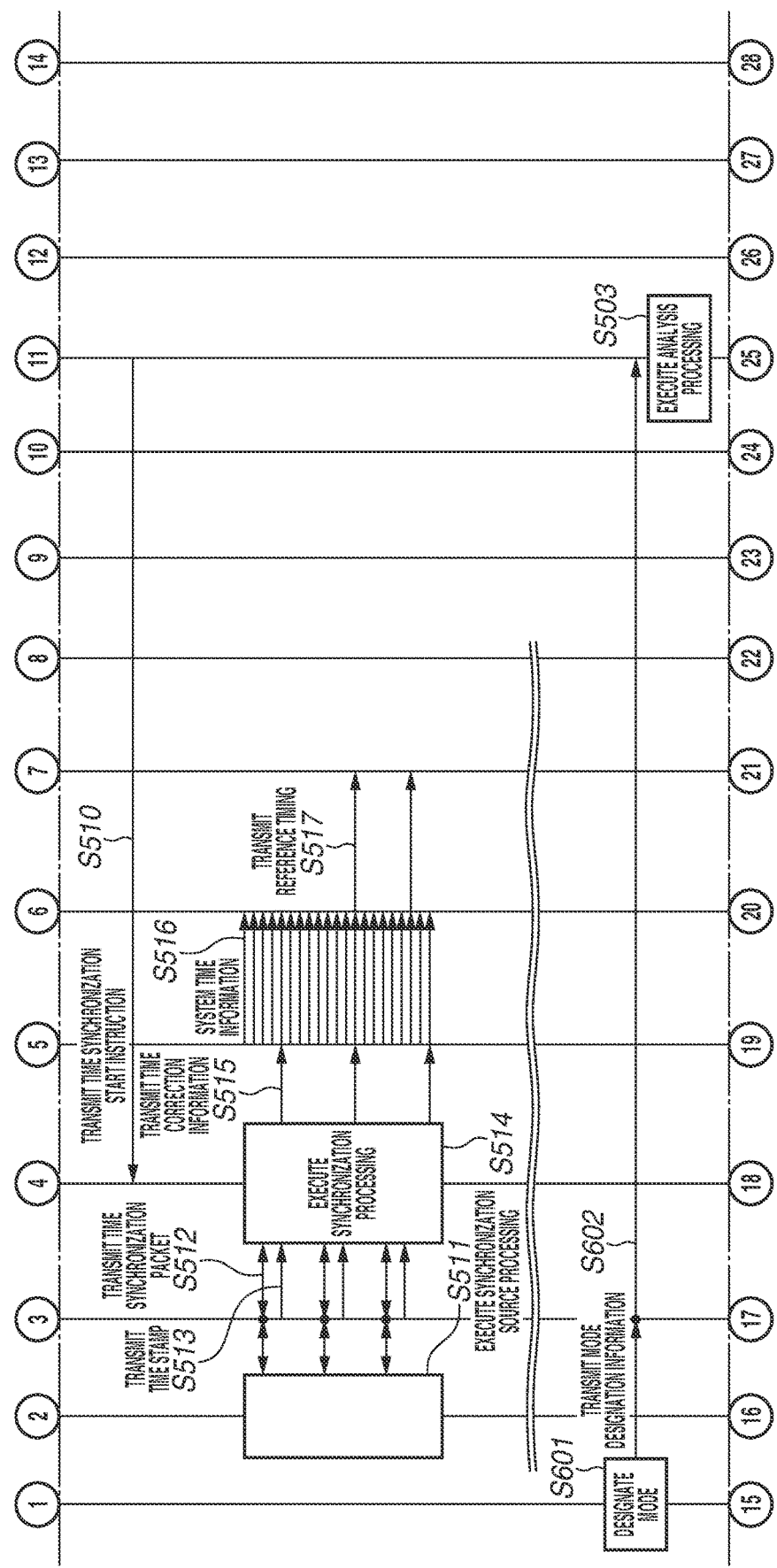

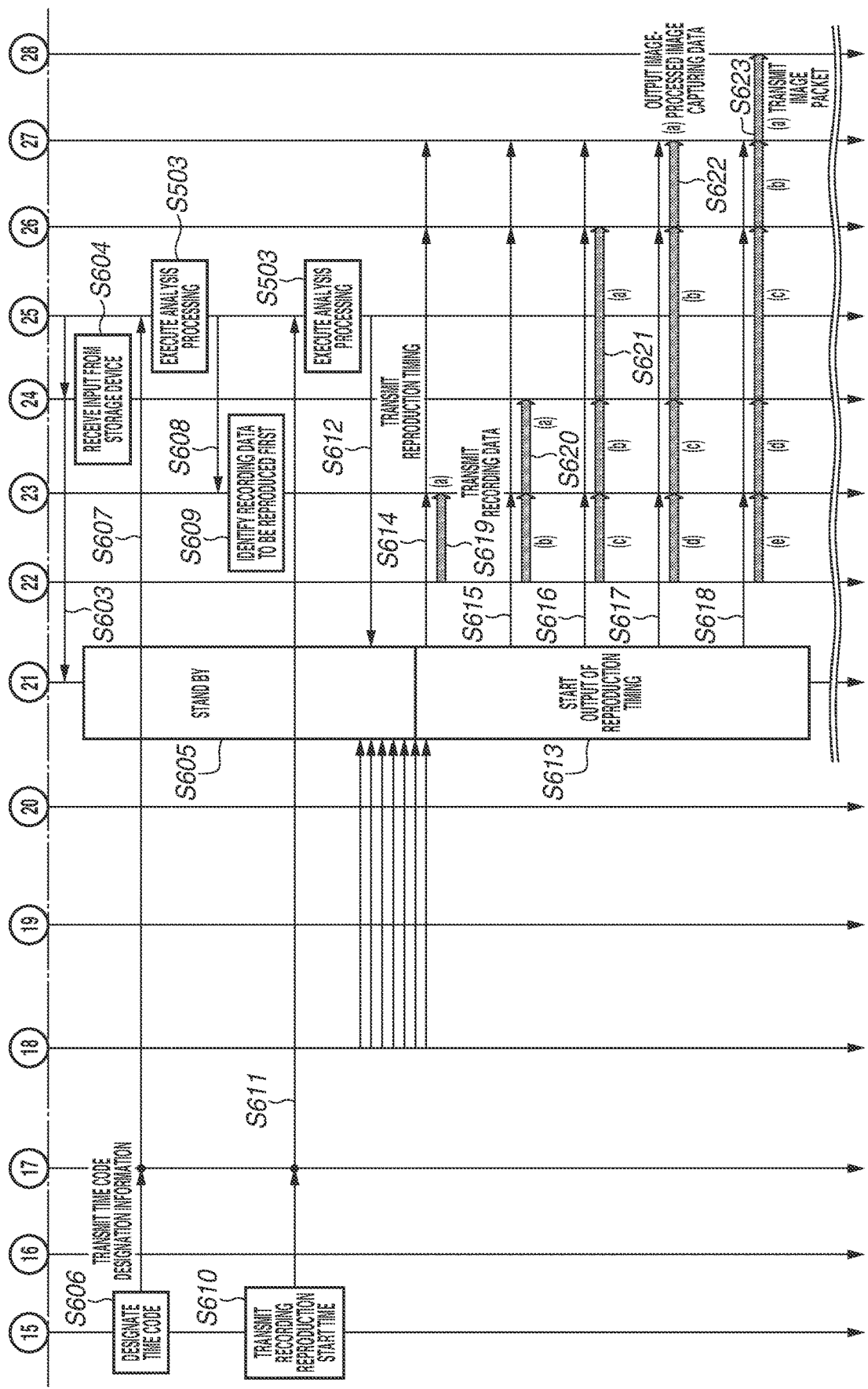

IMAGE PROCESSING SYSTEM, IMAGE PROCESSING APPARATUS, CONTROL METHOD OF IMAGE PROCESSING APPARATUS, AND STORAGE MEDIUM

BACKGROUND

Technical Field

The present disclosure relates to an image processing system that processes a plurality of pieces of image data that are based on a plurality of pieces of image capturing data, an image processing apparatus, and a control method of an image processing apparatus.

Description of the Related Art

There has been a technique of performing multi-view synchronous image capturing using a plurality of imaging apparatuses at different positions, and generating an image (hereinafter, referred to as a "virtual viewpoint image") viewed from any viewpoint designated by a user, using a plurality of images (hereinafter, referred to as "captured images") obtained by the image capturing. Using virtual viewpoint images enables a user to view a highlight scene of, for example, soccer or basketball from various angle of views, and thus virtual viewpoint images can cause the user to feel a higher sense of realism as compared with normal captured images. To generate highly accurate virtual viewpoint images, it is desirable to generate three-dimensional shape data based on images captured by the imaging apparatuses at the same time. It is thereby desirable to synchronously acquire images captured by the imaging apparatuses at the same time. In the field of a monitoring camera technique, it is also desirable to synchronously acquire images using the imaging apparatuses at the same time to display images captured by a plurality of imaging apparatuses side by side at the same time.

Japanese Patent Application Laid-Open No. 2019-50593 discusses a technique of a system that generates virtual viewpoint images. Japanese Patent Application Laid-Open No. 2023-3096 also discusses a technique for synchronously reproducing a plurality of images captured by a plurality of imaging apparatuses.

To obtain good virtual viewpoint images in an image processing system, image processing is to be varied depending on an imaging condition (e.g., illumination condition, sunshine status), a subject condition (e.g., the number/size of subjects, arrangement status of stationary object/moving object), or the like. Specifically, it is desirable to optimize image processing parameters in image processing apparatuses respectively connected to a plurality of imaging apparatuses. For example, the system discussed in Japanese Patent Application Laid-Open No. 2019-50593 executes foreground-background separation processing as preprocessing of the generation of virtual viewpoint images, and a threshold value required for the processing corresponds to the image processing parameter. In addition, a parameter required for blurring correction processing of reducing image blurring attributed to camera shake also corresponds to an image processing parameter of an image processing apparatus. In optimizing image processing parameters, there are some cases where a workflow from image capturing of a subject to image generation and image evaluation is executed a plurality of times (image processing tuning process). Nevertheless, if a subject condition/sunshine condition changes while the workflow is executed a plurality of times, an output image is changed each time the subject condition/sunshine condition changes and it becomes difficult to evaluate an image processing parameter of an image processing apparatus. On the other hand, it is sometimes realistically difficult to keep an imaging condition/subject condition constant or reproduce a constant imaging condition/subject condition while the workflow is executed a plurality of times.

When a process is switched between the image processing tuning process and a main image capturing process, it is also desirable, from the system operation aspect, that system reconstruction such as apparatus change, apparatus attachment or detachment, or cable reconnection, does not occur. As the technique discussed in Japanese Patent Application Laid-Open No. 2023-3096, a synchronous reproduction technique for captured images that can be applied in each of the main image capturing process/image processing tuning process is discussed, but a synchronous reproduction technique required for each of the main image capturing process/image processing tuning process that uses the same system/apparatus is not discussed.

SUMMARY OF THE INVENTION

The present disclosure has been devised in view of at least one of the above-described issues, and the object of the present disclosure is to streamline an image processing tuning process in an image processing system that processes a plurality of pieces of image data that are based on a plurality of pieces of images capturing data.

According to an aspect of the present disclosure, an image processing apparatus that supplies image data to an image processing system configured to process a plurality of pieces of image data that are based on a plurality of pieces of image capturing data includes a first acquisition unit configured to acquire first image capturing data from an imaging unit configured to capture an image of an image capturing target, a second acquisition unit configured to acquire second image capturing data from a storage unit storing the second image capturing data captured by the imaging unit, an image processing unit configured to acquire image data by performing predetermined image processing on the first image capturing data acquired by the first acquisition unit or the second image capturing data acquired by the second acquisition unit in accordance with a setting of a mode, and an image data transmission unit configured to transmit the image data acquired by the image processing unit to an external device.

Further features of the present disclosure will become apparent from the following description of exemplary embodiments with reference to the attached drawings.

BRIEF DESCRIPTION OF THE DRAWINGS

FIG. 1 illustrates an example of an image processing system to which the present disclosure can be applied.

FIGS. 5A to 5C are sequence diagrams in a real-time reproduction mode of the image processing system.

FIGS. 6A to 6C are sequence diagrams in a recording reproduction mode of the image processing system.

DESCRIPTION OF THE EMBODIMENTS

Figure 2A:
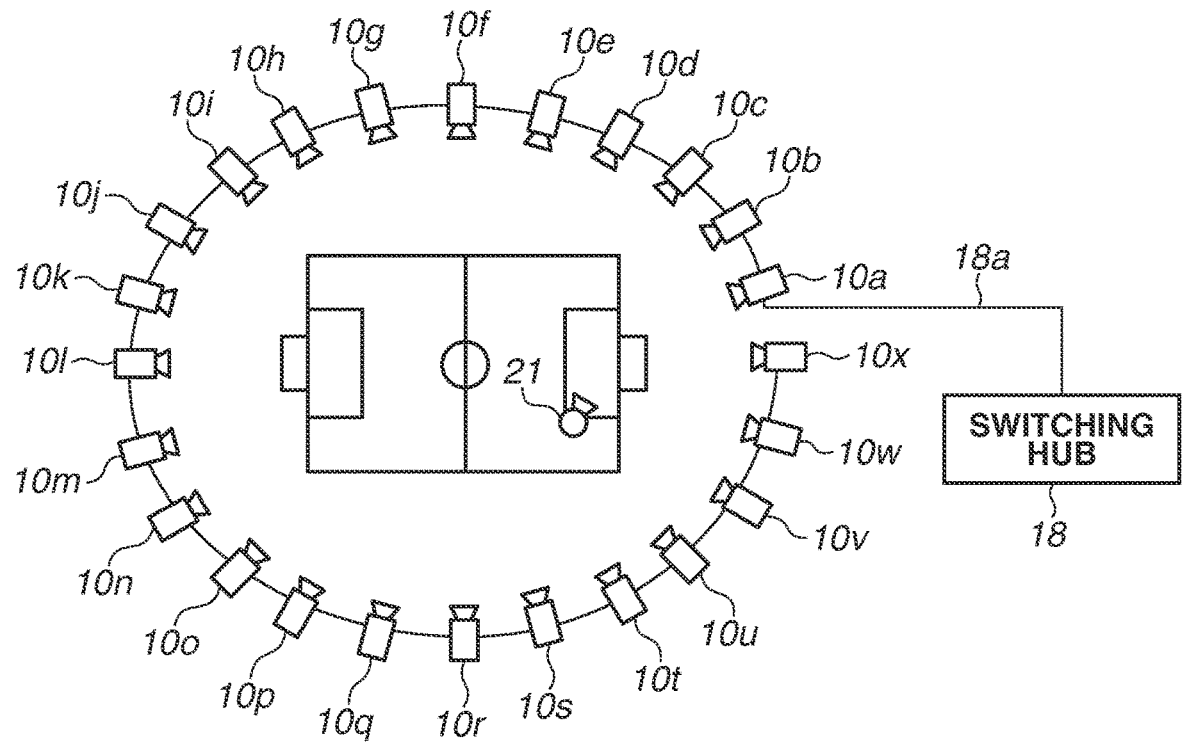
FIGS. 2A and 2B each illustrate an example of arrangement and connection of a sensor system.

Hereinafter, an exemplary embodiment of the present disclosure will be described in detail with reference to the accompanying drawings. The configuration to be described in the following exemplary embodiment is mere an example, and the present disclosure is not limited to the configurations illustrated in the drawings.

An example of an image processing system according to an exemplary embodiment of the present disclosure will now be described. FIG. 1 is a block diagram illustrating an example of a configuration of an image processing system. The image processing system 1 includes a plurality of sensor systems 10 (10a to 10x), an image computing server 13, a controller 16, a switching hub 18, an end user terminal 17, and a time server 12. The controller 16 includes a control station 14 and a virtual camera operation user interface (UI) 15. The sensor systems 10 (10a to 10x) respectively include image processing apparatuses 100 (100a to 100x), imaging apparatuses 11 (11a to 11x), and storage devices 110 (110a to 110x). In the image processing system 1, the imaging apparatuses 11 are arranged at mutually different positions in a facility, such as a playing field (stadium) or a concert hall, and perform image capturing of an image capturing target.

The description will be given assuming that the sensor systems 10 respectively include the image processing apparatuses 100, the imaging apparatuses 11, and the storage devices 110, but the numbers of the image processing apparatuses 100, the imaging apparatuses 11, and the storage devices 110 included in each of the sensor systems 10 are not limited to this.

For example, the number of the image processing apparatuses 100 included in each of the sensor systems 10 may be two or more. The sensor system 10 may include another apparatus in addition to the imaging apparatus 11, the image processing apparatus 100, and the storage device 110. The description will be given assuming that the imaging apparatus 11, the image processing apparatus 100, and the storage device 110 are separate apparatuses exteriorly covered with mutually different casings, but the imaging apparatus 11, the image processing apparatus 100, and the storage device 110 may be formed as an integrated apparatus exteriorly covered with the same casing. The description will be given assuming that all the sensor systems 10 have similar configurations, but the sensor systems 10 may have configurations in which a part or all of a plurality of the sensor system 10 are different. Hereinafter, the image processing apparatuses 100a to 100x, the imaging apparatuses 11a to 11x, and the storage devices 110a to 110x included in the sensor systems 10a to 10x will be described as the imaging apparatuses 11, the image processing apparatuses 100, and the storage devices 110 without distinction unless otherwise specified. The description will also be given assuming that the image processing system includes 24 sensor systems 10, but the number of the sensor systems 10 may be smaller or larger than 24 as long as the number is two or more. Hereinafter, the 24 sensor systems 10a to 10x will be simply described as the sensor systems 10 without distinction unless otherwise specified.

The imaging apparatus 11 includes a lens and an image sensor and outputs an image (hereinafter, referred to as a "captured image") obtained by capturing an image capturing target using the image sensor, as an image signal. In addition to the lens and the image sensor, the imaging apparatus 11 may include a microphone to output voice collected using the microphone, as a voice signal in addition to the image signal. The imaging apparatus 11 may be arranged with being fixed to a camera platform that can change an image capturing direction of the imaging apparatus 11 by rotating the imaging apparatus 11 in a pan, tilt, or roll direction. Hereinafter, the description will be given assuming that the term "image" includes the concepts of moving images and still images unless otherwise specific description is provided. That is, the image processing system 1 according to an exemplary embodiment of the present disclosure can process both still images and moving images.

The image processing apparatus 100 can perform processing in two modes. The first one of the modes will be referred to as a real-time reproduction mode. In the real-time reproduction mode, the image processing apparatus 100 generates image information corresponding to an image signal upon receiving the image signal output by the imaging apparatus 11 and records the image information in the storage device 110. Concurrently with the above-described recording processing, the image processing apparatus 100 also transmits, as a communication packet, processed image information obtained by performing predetermined image processing on the image information, to the image computing server 13. The mode described above is the real-time reproduction mode. The second mode of the two modes will be referred to as a recording reproduction mode. In the recording reproduction mode, the imaging apparatus 11 does not necessarily operate. The imaging apparatus 11 reads out image information preliminarily recorded in the storage device 110 in the real-time reproduction mode and transmits processed image information having been subjected to predetermined image processing, to the image computing server 13 as a communication packet. The mode described above is the mode described above is the recording reproduction mode. The details about the functions of the image processing apparatus 100 and the two modes will be described below.

A block diagram illustrated in FIG. 1 illustrates an example of a connection configuration of blocks included in the image processing system 1. In other words, a plurality of image processing apparatuses 100 in the image processing system 1 are configured to be able to communicate with each other by being daisy-chain connected using cables 19a to 19w. The image processing apparatus 100a, the image computing server 13, the time server 12, and the control station 14 are communicably connected to each other via the switching hub 18, and cables 18a, 12a, 13a, and 14a in such a manner that communication can be performed with each other. The connection configuration of the image processing system 1 is not limited to the connection configuration illustrated in FIG. 1. For example, all the sensor systems 10 may have a configuration of being directly connected to a switching hub.

The following description will be given assuming that the cables 18a and 19a to 19w in FIG. 1 employ Gigabit Ethernet® (GbE) or 10 GbE complying with an Institute of Electrical and Electronics Engineers (IEEE) standard, which corresponds to the Ethernet®, but another communication method can be used. For example, interconnect of InfiniBand or industrial Ethernet®, or a combination of these can be employed. The commination method is not limited to these, and another type of commination method can also be employed.

Figure 2B:
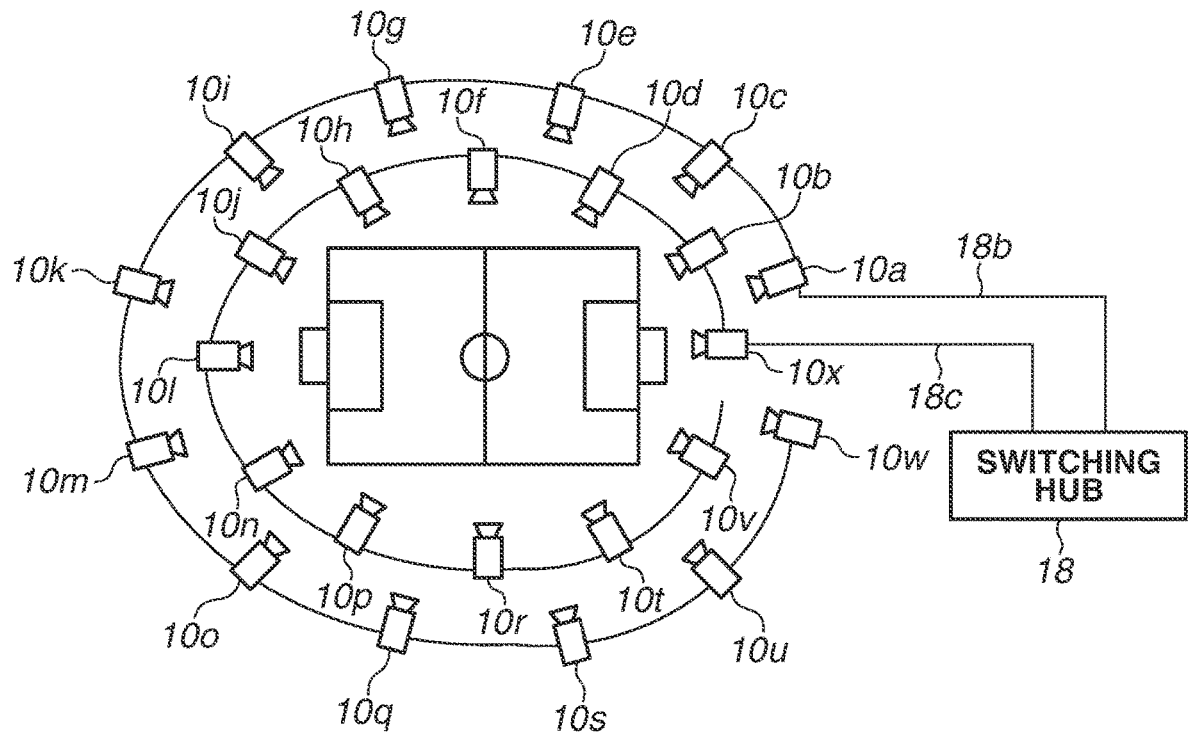

Next, an example of the arrangement and a connection method of the sensor systems 10 will be described with reference to FIGS. 2A and 2B. The imaging apparatuses 11 included in the sensor systems 10 are arranged at mutually different positions in such a manner as to surround a field of soccer or the like. The imaging apparatuses 11 are arranged in such a manner as to be able to capture images of an image capturing target such as a player playing in the field, from a plurality of mutually different directions. The image processing apparatuses 100 included in the plurality of sensor systems 10 are connected to each other by a daisy chain. By connecting the image processing apparatuses 100 to each other by the daisy chain, it is possible to reduce the number of connection cables and save the labor of a wiring work. FIG. 2A illustrates a configuration in which all the image processing apparatuses 100*a* to 100*x* are cascade-connected in such a manner as to form one daisy chain, but the connection configuration of the image processing system is not limited to this. For example, as illustrated in FIGS. 2B, the sensor systems 10 consisting of 24 sensor systems can be divided into two groups, and the sensor systems 10 (i.e., the image processing apparatuses 100) can be connected to each other by a daisy chain for each divided group. The number of groups into which a plurality of sensor systems 10 are divided is not limited to two and may be three or more. The connection configuration of dividing a plurality of sensor systems 10 into several groups is advantageous especially for a stadium in which auditoriums are arranged in a mortar shape around a field. For example, a case can be considered where auditoriums are arranged over a plurality of floors, and sensor systems 10 are arranged on each floor on which auditoriums are arranged. In this case, for example, the sensor systems 10 arranged on each floor are regarded as one group, and sensor systems 10 belonging to the same group are connected by a daisy chain. With such a connection configuration, it is possible to simplify wiring and make the system more flexible. Furthermore, with such a connection configuration, it is possible to divide data flowing on a network, and it becomes possible to increase a data amount of image information to be output by the image processing apparatus 100. The configuration of dividing a plurality of sensor systems 10 into several groups and daisy-chain connecting the sensor systems 10 is not limited to the configuration of classifying sensor systems 10 arranged on each floor, into one group. For example, a plurality of sensor systems 10 can be arranged in such a manner that two groups of sensor systems 10 surround a field. In this case, sensor systems 10 arranged at positions corresponding to a half round of the circumference of the field can be classified into one group, and the sensor systems 10 belonging to the same group can be connected by a daisy chain. With such a connection configuration, it is possible to simplify wiring and make the system more flexible. The following description will be given assuming that a plurality of image processing apparatuses 100 are connected to each other by a daisy chain similarly to the connection configuration illustrated in FIG. 2A.

The description will return to FIG. 1. The virtual camera operation UI 15 receives a signal indicating the position and orientation of a virtual camera that are based on the input of an operator, from an operation input apparatus (not illustrated), and outputs information corresponding to the signal, to the image computing server 13 as viewpoint information about the virtual camera. The viewpoint information about the virtual camera is designated based on not only the input of an operator of the controller 16. For example, the viewpoint information about the virtual camera can be automatically designated based on an analysis result of an image that is based on a captured image acquired by the imaging apparatus 11. The control station 14 performs the management of an operation state and the setting or control of parameters for each of the blocks included in the image processing system 1. The virtual camera operation UI 15 provides a user interface for designating the position and orientation of a virtual camera to be used when a virtual viewpoint image is generated. The virtual camera is an imaging apparatus that acquires a captured image (virtual viewpoint image) of an image capturing target at a virtual viewpoint different from any viewpoint of the imaging apparatuses 11*a* to 11*x*. The virtual camera is a virtual imaging apparatus defined to generate a virtual viewpoint image. By providing the virtual camera operation UI 15 including an operation input device, such as a mouse or a joystick, an operator of the controller 16 can designate the position and orientation of a virtual camera by using the operation input device.

For example, the position and orientation of a virtual camera can be designated by an operator of the controller 16 designating a virtual camera path. The virtual camera path is an information arrangement indicating the position and orientation of a virtual camera for each frame.

The image computing server 13 is an information processing apparatus including a computer. The image computing server 13 receives image information output by each of the image processing apparatuses 100 as one image set, and acquires captured images (hereinafter, "a plurality of viewpoint images") indicated by each image information in one image set. The image computing server 13 also acquires viewpoint information output by the virtual camera operation UI 15 and generates a virtual viewpoint image that appears to be an image captured by the virtual camera, based on the plurality of viewpoint images and the viewpoint information.

In other words, using the image computing server 13, it is possible to generate a virtual viewpoint image as if the image was captured by an imaging apparatus (denoted by 21 in FIG. 2A) existing near a goal, for example. A method of generating a virtual viewpoint image based on a plurality of viewpoint images and viewpoint information is known, and thus the detailed description will be omitted.

The image computing server 13 outputs the generated virtual viewpoint image to the end user terminal 17. The image computing server 13 may output the generated virtual viewpoint image to the end user terminal 17 after performing compression coding by standard image coding, such as H.264 or High Efficiency Video Coding (HEVC). For example, the image computing server 13 may output the virtual viewpoint image having been subjected to the compression coding, by standard streaming that uses Moving Picture Experts Group (MPEG)-Dynamic Adaptive Streaming over HTTP (DASH) protocol.

The streaming that uses the MPEG-DASH is an example, and a streaming method of a virtual viewpoint image is not limited to the MPEG-DASH, and a streaming method, such as HTTP Live Streaming (HLS), can also be used as a streaming method of a virtual viewpoint image. Alternatively, the image computing server 13 can output the generated virtual viewpoint image to the end user terminal 17 in an uncompressed state. The image computing server 13 switches a control mode of image processing depending on whether the number of lane (route) of the daisy chain for outputting the image information to the image computing server 13 is one or more than one. In other words, the image computing server 13 can switch a control mode depending on whether the sensor systems 10 are divided into a plurality of groups. As described above, since the image processing apparatuses 100 are connected to each other by a daisy chain, image information output from each of the image processing apparatuses 100 is transmitted to the image computing server 13 as described below in the case of the connection configuration illustrated in FIG. 2A, for example. Image information acquired or generated by the image processing apparatus 100a is transmitted to the image processing apparatus 100b via a cable 19a. The image processing apparatus 100b transmits image information generated by the image processing apparatus 100b or acquired from a storage device to the image processing apparatus 100c together with image information transmitted from the image processing apparatus 100a. Thereafter, similar transmission is repeated up to the image processing apparatus 100x. Consequently, information obtained by combining image information generated by each of the image processing apparatuses 100a to 100w or acquired from storage devices is transmitted to the image processing apparatus 100x from the image processing apparatus 100w via the cable 19w. The image processing apparatus 100x outputs the information transmitted from the image processing apparatus 100w to the image computing server 13 together with image information generated by the image processing apparatus 100x or acquired from the storage device. Specifically, information output from the image processing apparatus 100x (i.e., information obtained by combining image information generated by each of the image processing apparatuses 100a to 100x or acquired from the storage devices) is transmitted to the image computing server 13 via the switching hub 18. In a case where the number of the image processing apparatuses 100 that output image information to the image computing server 13 is one, the image computing server 13 can therefore acquire all pieces of image information generated or acquired by each of a plurality of image processing apparatuses 100, at the same timing. In other words, in a case where the sensor systems 10 are not divided into groups, timings are synchronized at which the image computing server 13 acquires all pieces of image information corresponding to one image set. Nevertheless, in a case where the number of image processing apparatuses 100 that output image information to the image computing server 13 is a plural number (in a case where a plurality of sensor systems 10 are divided into a plurality of groups), the following case can occur. For example, a delay time until the image computing server 13 acquires image information can vary for each lane (route) of the daisy chain. For this reason, the image computing server 13 is sometimes required to wait until all pieces of image information corresponding to one image set are acquired, to perform subsequent image processing and generate a virtual viewpoint image.

The end user terminal 17 includes a smartphone, a tablet terminal, or a personal computer, and displays a virtual viewpoint image upon receiving the virtual viewpoint image output by the image computing server 13. In a case where a virtual viewpoint image output by the image computing server 13 is a virtual viewpoint image having been subjected to compression coding, the end user terminal 17 receives a virtual viewpoint image that has been subjected to compression coding and output by the image computing server 13 to decode the virtual viewpoint image. The end user terminal 17 outputs the decoded virtual viewpoint image to a display included in the terminal or connecting to the terminal to display the virtual viewpoint image on the display.

In a case where a virtual viewpoint image output by the image computing server 13 is an uncompressed virtual viewpoint image, the end user terminal 17 may be a monitor being a terminal that can receive the uncompressed virtual viewpoint image as a display signal and display a virtual viewpoint image that is based on the display signal.

The time server 12 outputs a time (hereinafter, "reference time") serving as a reference of a system. The reference time output by the time server 12 is delivered to the image processing apparatuses 100a to 100x included in the sensor systems 10a to 10x via the switching hub 18. For example, the time server 12 periodically outputs a reference time at a predefined time interval. The description has been given above with reference to FIG. 1.

Figure 3:
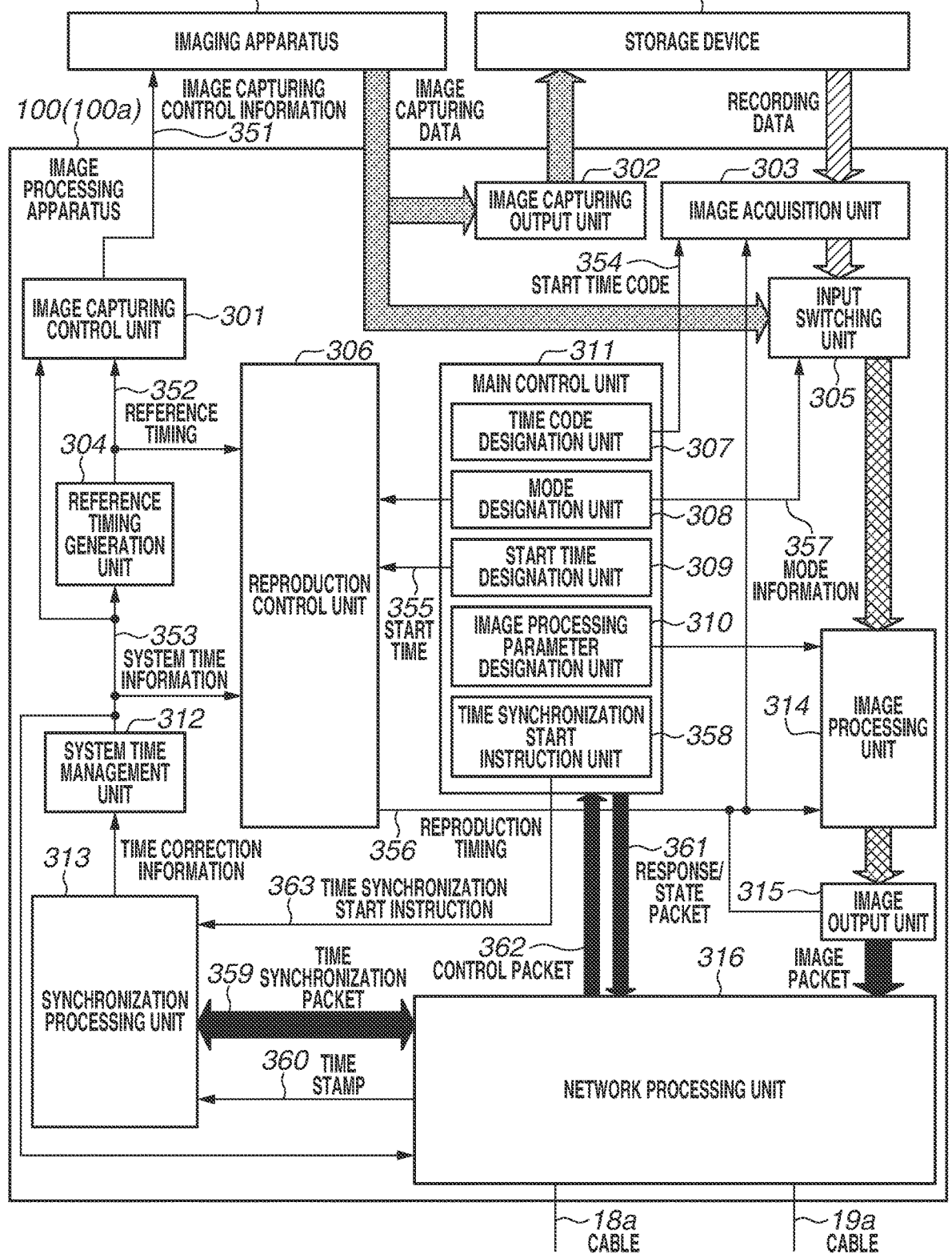
FIG. 3 is a functional block diagram of an image processing apparatus.

An example of the configuration of functional blocks included in the image processing apparatus 100 will now be described with reference to FIG. 3. The processing of each component included in the image processing apparatus 100 is executed by hardware, such as an application specific integrated circuit (ASIC), built in the image processing apparatus 100. The processing may be executed by hardware, such as a field programmable gate array (FPGA). The processing may also be executed by software that uses a central processor unit (CPU) or a graphic processor unit (GPU) and a memory.

A synchronization processing unit 313 has a function of synchronizing the time of the image processing apparatus 100 with the time server 12. Specifically, the synchronization processing unit 313 performs synchronization using a method in compliance with an Institute of Electrical and Electronics Engineers (IEEE) 1588 standard. The synchronization processing unit 313 performs time synchronization with the time server 12 using a time synchronization packet 359 for communicating with the time server 12 via a network processing unit 316 and a time stamp 360 output by the network processing unit 316 at a transmission/reception timing of a time synchronization packet. In the IEEE 1588 standard, a Precision Time Protocol (PTP) packet is used as a time synchronization packet, and the synchronization processing unit 313 has a processing function of the PTP packet. The time synchronization method with the time server 12 is not limited to a method that uses the IEEE 1588 standard and may be a method that uses an Ether Audio Video Bridging (AVB) standard or a predefined unique protocol. A time difference (offset) between the time server 12 and a system time management unit 312 is calculated by time correction processing, and therefore a time correction amount is determined in such a manner as to reduce the offset, and the correction amount is set in the system time management unit 312.

The system time management unit 312 is a management unit of time information of the image processing apparatus 100. The system time management unit 312 includes a counter that can update system time information 353 as time passes. The system time management unit 312 also has a function of enabling correction of the above-described counter from the synchronization processing unit 313. There are desirably three patterns of correction methods. The first method is a method by which an arbitrary time is set (overwriting correction). The overwriting correction is mainly used in an initial process of synchronization processing. The second method is a method by which a difference (i.e., a progress/return amount from the current value indicated by the system time management unit 312) is set (difference correction). The first method sets a designated time, and thus a high-accurate correction result is not always obtained if it is considered that a fluctuation occurs in a timing at which a time is set. Nevertheless, the second method gives an offset amount, even if correction processing takes a long time, for example, both the time of the correction processing and the time of the system time management unit 312 advance. And thus, an expected progress/return amount can be consequently obtained. The third method is a method of correcting an amount (pace) by which the above-described counter is incremented (pace correction).

The correction is correction of incrementing the counter by 1.001 seconds per second or incrementing the counter by 0.999 seconds per second in contrast. An update timing of the above-described counter is typically determined based on the clock accuracy of an oscillator in the image processing apparatus 100. Nevertheless, with the above-described configuration, it is possible to perform correction suitable for the oscillator accuracy. By having a minor correction amount sufficient for required accuracy, highly accurate correction can be realized. That is, in a case where the oscillator accuracy is faster than the pace of an absolute time, it is possible to advance the counter in such a manner as to get close to the pace of the absolute time by reducing an increment amount. The system time management unit 312 has been described above.

A reference timing generation unit 304 outputs a reference timing 352 based on the system time information 353. For example, if an image capturing cycle of the imaging apparatus 11 is 59.94 Hz, a signal at this frequency is desirably output as a reference timing. If required control information is generated by an image capturing control unit 301, the frequency of the reference timing generation unit 304 is not necessarily be 59.94 Hz, and the reference timing generation unit 304 may output the reference timing 352 as pulse per second (PPS) of 1 Hz.

The image capturing control unit 301 performs control of the imaging apparatus 11 by supplying image capturing control information 351 to the imaging apparatus 11. The image capturing control information 351 includes control/setting information including an image capturing parameter, such as the number of pixels, a color depth, a frame rate, and a white balance of a captured image, an image capturing timing signal indicating an image capturing timing, and setting information about an image capturing time. The control of the imaging apparatus 11 may be the acquisition of the state of the imaging apparatus 11 (i.e., an on-camera state, a stopping state, a synchronizing state, and an error), the control of start or stop of image capturing, or adjustment for focusing or zooming. The lens adjustment for focusing or zooming may be performed via the imaging apparatus 11, and in a case where an interchangeable lens is attached to the imaging apparatus 11, the image processing apparatus 100 and a lens may be connected and the lens adjustment may be directly performed. As to an image capturing timing signal, the image capturing control unit 301 generates an image capturing timing signal based on the input reference timing 352 and the system time information 353 and supplies the image capturing timing signal to the imaging apparatus 11. The imaging apparatus 11 performs image capturing at a timing at which a synchronization signal is received from the image processing apparatus 100 by receiving an image capturing timing signal output from the image processing apparatus 100 and applying Generator Lock (GENLOCK) to the image capturing timing signal. In other words, image capturing timings of all of the plurality of imaging apparatuses 11 are synchronized based on image capturing timing signals output from the image capturing control units 301 included in the image processing apparatuses 100. The setting of time is performed by outputting information regarding the current time synchronized with the time server 12, to the imaging apparatus 11 as a time code complying with the SMPTE12M, for example.

In addition information indicating a captured image, the imaging apparatus 11 includes a time code corresponding to a time (hereinafter, "image capturing time") at which a captured image is captured (i.e., time code provided from the image capturing control unit 301 to the imaging apparatus 11), in an image signal as metainformation, and outputs the image signal. The format of the time code is not limited to the SMPTE12M, and another format can be used. In addition to the time code, the metainformation may include a sequence number or a data type of a captured image, or information indicating an identifier indicating an individual of the imaging apparatus 11. In this manner, the image capturing control units 301 included in the image processing apparatuses 100 can obtain image signals indicating captured images captured by all the imaging apparatuses 11 in highly accurate synchronization.

An image capturing output unit 302 outputs a captured image and a time code that have been output from the imaging apparatus 11, to the storage device 110, and stores the captured image and the time code in the storage device 110.

An image acquisition unit 303 acquires image information based on time information from the storage device 110 storing image information and time information in association. The image of which time code is used to acquire the image information is determined based on a start time code 354 output from a time code designation unit 307.

In addition, a time code indicating a time at which the acquisition is to be ended may be made receivable. As to an image acquisition timing, the acquisition is performed at a timing at which a reproduction timing 356 input from a reproduction control unit 306 is input. In addition to image information, the image acquisition unit 303 may acquire time information corresponding to the image information.

An input switching unit 305 switch data to be input to an image processing unit 314, between image capturing data of a captured image that has been output from the imaging apparatus 11 and recording data of a captured image that has been output from the image acquisition unit 303. The input data is switched in accordance with mode information 357 from a mode designation unit 308. In the real-time reproduction mode, image capturing data is selected, and in the recording reproduction mode, recording data is selected.

The image processing unit 314 executes image processing on image data input from input switching unit 305, and outputs the processed image data to an image output unit 315. One-frame image data is input each time the reproduction timing 356 is input, and therefore image processing is to be completed within the cycle of the reproduction timing 356. Thus, in a case where it is difficult to execute all processing within the cycle, image processing may include a pipeline of a plurality of stages. Image processing to be executed by the image processing unit 314 includes foreground-background separation processing of separating the foreground and the background in an image, and blurring correction processing of reducing image blurring attributed to a camera shake. The foreground-background separation processing is characterized in that foreground data is extracted from image data, but the foreground-background separation processing may include extracting background data from image data. The description of the details of the processing is similar to the description described in Japanese Patent Application Laid-Open No. 2019-50593, and thus the description will be omitted. The recording reproduction mode according to an exemplary embodiment of the present disclosure is used to determine an optimum parameter by performing trial while changing a parameter to be set in the image processing unit 314, each time the virtual viewpoint image generation processing that uses the recording reproduction mode is executed. The parameter is set by an image processing parameter designation unit 310.

By executing image processing in the image processing apparatus 100 as in the present disclosure, processing load on the image computing server 13 is reduced. For example, by executing the foreground-background separation processing in the image processing unit 314, it becomes unnecessary to perform foreground-background separation on all captured images indicated by image information acquired by the image computing server 13. Consequently, processing loads on the components can be equalized for the entire image processing system. It is also possible to obtain an effect to reduce a used network bandwidth by executing the foreground-background separation processing in the image processing apparatus 100 and reducing the number of the image processing apparatuses 100 that transfer information for each foreground or for each background. The foreground-background separation on a captured image indicated by image information is not always performed by the image processing unit 314 and may be performed by the image acquisition unit 303, for example, when image information is acquired.

The reproduction control unit 306 controls a processing timing of the entire image processing apparatus 100. Specifically, the reproduction control unit 306 supplies processing start timings of the image processing unit 314 and the image output unit 315 to be used in both modes of the real-time reproduction mode and the recording reproduction mode. The image acquisition unit 303 to be used in the recording reproduction mode also controls a timing at which image information is acquired from the storage device 110. In the real-time reproduction mode, the same cycle as an image capturing timing is set as a timing cycle. In the recording reproduction mode, reproduction may be executed at a cycle at which recording data is captured, or the cycle needs not be limited to this. For example, reproduction may be performed at a further long cycle, or an operation may be performed at a cycle shorter than the image capturing cycle as long as a processing time of each processing unit can be executed in time. If an operation is executed at a short cycle, there is an advantage in that an evaluation time can be reduced by a time corresponding to a time reduced by the generation of a virtual viewpoint video of a fixed period getting fast. If an operation is performed at a long cycle, for example, there is an advantage that it becomes possible for the user to execute evaluation while performing check for each frame. As for the reproduction time in the recording reproduction mode, it is desirable that the setting of a reproduction cycle in the recording reproduction mode is also included in the mode information 357 designated by the mode designation unit 308. The reproduction timing 356 is generated based on the reference timing 352. For example, in the case of generating a signal at 59.94 Hz in which the reference timing 352 is a frame rate in recording and using the real-time reproduction mode, the frequency of the reference timing 352 can be used as the reproduction timing 356 as is. In the case of operating in the recording reproduction mode, it is sufficient that the reference timing 352 is multiplied in accordance with a reproduction cycle at the time. By causing an operation clock of the reproduction control unit 306 to operate at a frequency sufficiently higher as compared with a frequency of the reference timing 352, it is possible to easily execute multiplication processing. The output start of the reproduction timing 356 is determined by comparing a start time 355 from a start time designation unit 309 and the system time information 353. For example, in a case where a time indicated by the system time information 353 has not reached the start time 355, the reproduction timing 356 is desirably masked. The reproduction control unit 306 has been described above.

The image output unit 315 performs processing of transmitting image data processed by the image processing unit 314, to the network processing unit 316 after converting the image data into a packet that can be transmitted via a network. The transmission destination is set to the image computing server 13. In a case where a size of image data exceeds a Maximum Transmission Unit (MTU) being a maximum data gram size that can be transferred in one packet, the image data is transmitted to the network processing unit 316 after being divided into a plurality of packets. Each time the reproduction timing 356 is input, one-frame image data is input to the image processing unit 314. Accordingly, packetization of one-frame image data and transmission to the network processing unit 316 are executed within the cycle of the reproduction timing 356.

The network processing unit 316 has a function of causing the image processing apparatus 100 to communicate using an external packet. If a packet that has arrived from a cable 18a is directed to an own device, the packet is transferred to a main control unit 311 or the synchronization processing unit 313 in accordance with a packet type. In a case where a packet received from the cable 18a is not directed to the own device, forward processing is performed on the cable 19a.

The same applies to a packet received from the cable 19a. The network processing unit 316 also transmits a packet generated within the image processing apparatus 100. The packet is input from any of the main control unit 311, the synchronization processing unit 313, and the image output unit 315, and is output from the cable 18a or the cable 19a in accordance with the destination of the packet. If the network processing unit 316 has a function of providing a value of the system time information 353 to the synchronization processing unit 313 as the time stamp 360 at the timing and in a case where the time synchronization packet 359 is transmitted or received, highly accurate time synchronization processing can be realized in the synchronization processing unit 313. When forward processing of a time synchronization packet is performed, it is possible to execute time synchronization with high accuracy in synchronization of the image processing apparatus 100 provided posterior to the own device if a Transparent Clock (hereinafter, TC) function predetermined by the IEEE 1588 is included. Even if the network processing unit 316 does not have the TC function, it is possible to implement the TC function in the synchronization processing unit 313 by receiving all the time synchronization packets 359 by the synchronization processing unit 313 irrespective of whether the packets are directed to the own device or another device, and performing forward processing from the synchronization processing unit 313.

The main control unit 311 performs entire control of the image processing apparatus 100. The main control unit 311 is configured to receive a control packet 362 from the control station 14 and issue instructions to various processing units. The main control unit 311 also has a function of transmitting a response/state packet 361 to the control station 14. In accordance with the type of the control packet 362 received from the control station 14, the following processing is executed.

The time code designation unit 307 acquires a start time code and an end time code in the recording reproduction mode that have been input by an operator of the controller 16, from the control station 14 as start/end time code information and performs the setting in the image acquisition unit 303.

The mode designation unit 308 identifies a processing mode required for the image processing apparatus 100 through the control packet 362 from the control station 14 and sets the mode information 357 in the reproduction control unit 306 and the input switching unit 305. In a case where a designated mode is a recording generation mode and a reproduction cycle is designated by the control packet 362, a reproduction cycle is set in the reproduction control unit 306 at the same time.

The start time designation unit 309 analyzes a time at which the image acquisition unit 303 starts acquisition of image information, from the control packet 362, and sets the time in reproduction control unit 306 as the start time 355. Here, the start time 355 is a future time as compared with a time indicated by the system time information 353, and the reproduction control unit 306 included in each of the image processing apparatuses 100 waits to output the reproduction timing 356 until the time indicated by the system time information 353 reaches the start time 355. When the time indicated by the system time information 353 reaches the start time 355, the reproduction control unit 306 starts outputting the reproduction timing 356. By setting the start times 355 of all the image processing apparatuses 100 to the same time, it is possible to cause the image acquisition units 303 in all the image processing apparatuses 100 to start the acquisition of image information at the same timing. This can be realized because the system time information 353 is synchronized by the synchronization processing unit 313 with the times of the time servers 12 in all the image processing apparatuses 100.

The image processing parameter designation unit 310 performs processing of extracting an image processing parameter input by an operator of the controller 16 from the control packet 362 received from the control station 14 and setting the image processing parameter in the image processing unit 314.

A time synchronization start instruction unit 358 extracts a time synchronization start instruction input by an operator of the controller 16 from the control packet 362 received from the control station 14 and issues a time synchronization start instruction 363 to the synchronization processing unit 313. An example of the configuration of functional blocks included in the image processing apparatus 100 has been described above. In the example illustrated in FIG. 3, a method of synchronizing timings of reproduction processing has been described. In a case where image capturing processing is strictly synchronized, information obtained by the start time designation unit 309 may be input to the reference timing generation unit 304 or the image capturing control unit 301, and output start timings of the reference timing 352 or the image capturing control information 351 may be made synchronizable.

In this manner, by including the mode designation unit 308 and the input switching unit 305, the image processing apparatus according to an exemplary embodiment of the present disclosure becomes able to switch a mode between the real-time reproduction mode and the recording reproduction mode. In the real-time reproduction mode, image capturing data acquired by an imaging apparatus is transmitted to the next image processing apparatus without recording the data (without storing in the storage device). With this configuration, the image processing system according to exemplary embodiment of the present disclosure makes it possible to provide a virtual viewpoint image of an image capturing region to the user. In the recording reproduction mode, recording data is acquired from a storage device, and the recording data is transmitted to the next image processing apparatus. In the storage device, image capturing data acquired by an imaging apparatus is recorded as the recording data. In the recording reproduction mode, it is considered, by performing the generation of a virtual viewpoint image using recording data, that the influence of disturbance is reduced as compared with the real-time reproduction mode and the generation of a more accurate virtual viewpoint image becomes executable. By being configured to able to support the above-described modes, the image processing apparatus according to an exemplary embodiment of the present disclosure can switch a mode to a mode suitable for user intention, an image capturing timing, or the status of an image capturing region, without performing system reconstruction.

Figure 4:
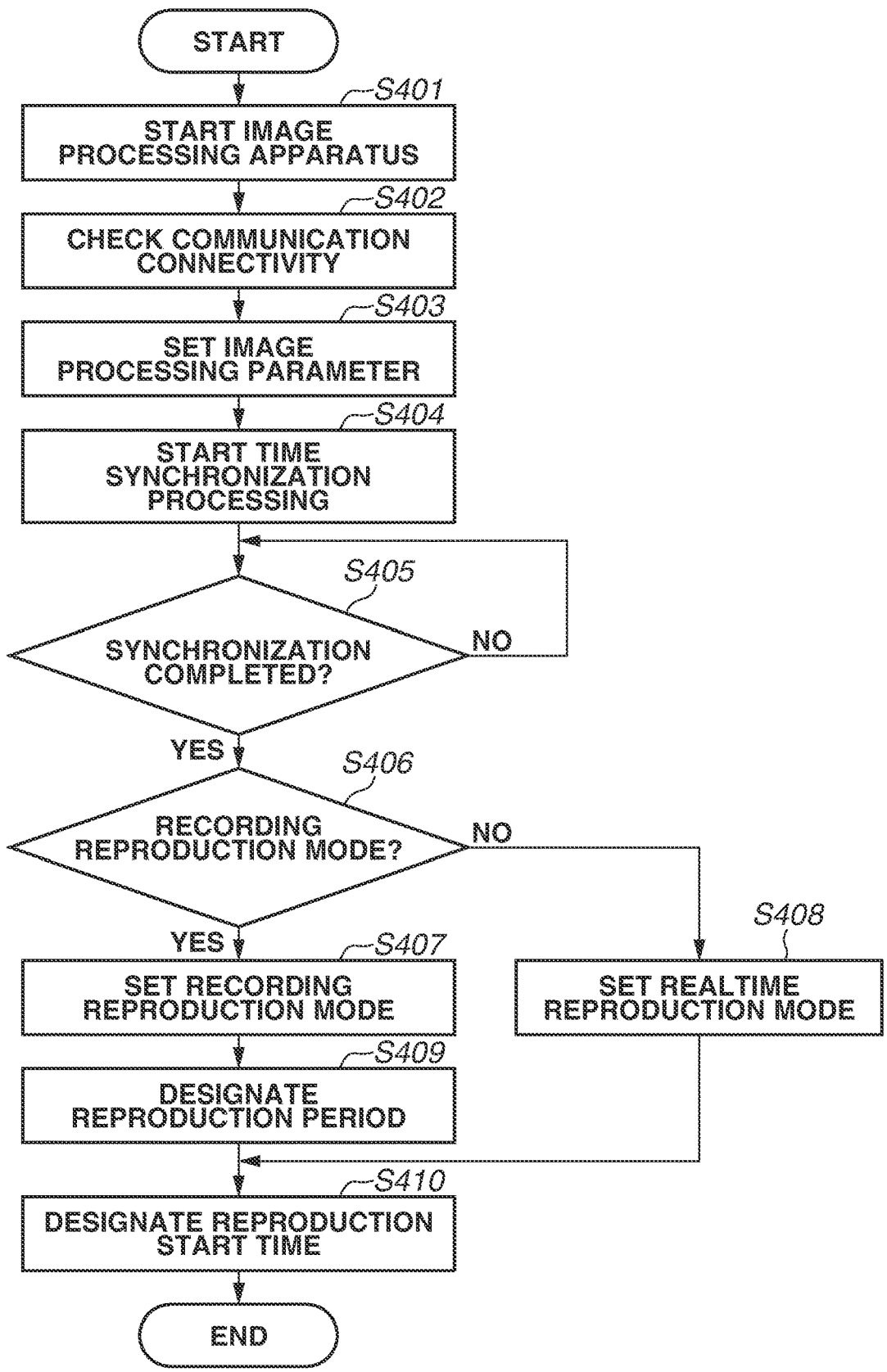
FIG. 4 is a flowchart illustrating processing in a control station.

Next, an execution procedure of this image processing system will be described. FIG. 4 is a flowchart illustrating an example of processing of the control station 14. In step S401, the control station 14 firstly performs start processing on each of the image processing apparatuses 100 via the switching hub 18.

If the image processing apparatuses 100 support a Wake On local area network (LAN) (WOL) function, the control station 14 starts the image processing apparatuses 100 using a Magic Packet in order from the image processing apparatus 100a existing at the top of the daisy chain. After the start of the image processing apparatuses 100 is completed, the control station 14 checks, in step S402, a communication connectivity of each of the image processing apparatuses 100. For example, the control station 14 transmits an Internet Control Message Protocol (ICMP) packet to each of the image processing apparatuses 100 and checks a response. In step S403, the control station 14 sets an image processing parameter for each of the image processing apparatuses 100. The image processing parameter is stored in a control packet and transmitted from the control station 14 to all the image processing apparatuses 100 and set in the image processing unit 314 of each of the image processing apparatuses 100. Image capturing data varies depending on the position at which each of the imaging apparatuses 11 is arranged, and therefore different parameters may be set in the image processing units 314. In step S404, the control station 14 issues an instruction to start time synchronization processing. This causes each of the image processing apparatuses 100 to start time synchronization processing with the time server 12. In step S405, the control station 14 waits until time when synchronization of each of the image processing apparatuses 100 is completed. For example, the control station 14 makes an inquiry about a time synchronization status of each of the image processing apparatuses 100 and checks a response to the inquiry. For example, it can be determined that the time synchronization is completed based on a condition that an offset consecutively falls within a predetermined range for a predetermined time, e.g., one minute. In step S406, mode designation is performed for each of the image processing apparatuses 100. Recording data is not stored at the time of initial image capturing, and thus the real-time reproduction mode is selected (NO in step S406). In step S408, the real-time reproduction mode is set in a control packet that designates a mode from the control station 14, and the control packet is transmitted to each of the image processing apparatuses 100. In a case where the real-time reproduction mode is designated, processing in the real-time reproduction mode is started at a predetermined time by setting, in step S410, a reproduction start time in each of the image processing apparatuses 100. In a case where the image processing system is operated for the second time or later, recording data is recorded in the storage device 110 by the real-time reproduction mode, and thus virtual viewpoint image generation in the recording reproduction mode is executable. After the completion of time synchronization processing, each of the image processing apparatuses 100 is therefore set, in step S407, to the recording reproduction mode. This means that the recording reproduction mode is set in a control packet for designating a mode from the control station 14, and the control packet is transmitted to each of the image processing apparatuses 100. In step S409, the designation of a section is performed based on which period in the entire recorded period of a generated virtual viewpoint image is to be generated. Specifically, a start time code and an end time code as required are set in a control packet, and the control packet is transmitted to all the image processing apparatuses 100. Thereafter, in step S410, the designation of a reproduction start time in the recording reproduction mode is performed, and the reproduction is started at the same time as that in the real-time reproduction mode. The description has been given above with reference to FIG. 4.

A processing sequence of functional blocks of the image processing apparatus 100 will be described in both cases of the real-time reproduction mode and the recording reproduction mode with reference to FIGS. 5 and 6. The real-time reproduction mode (FIGS. 5A to 5C) will firstly be described. In step S501, the control station 14 checks a communication connectivity of the image processing apparatus 100. The control station 14 performs the communication connectivity by transmitting, in step S502, an ICMP packet to the network processing unit 316 based on the presence or absence of a response (step S504) to the packet that is transmitted. In step S503, the image processing apparatus 100 performs analysis processing of a control packet addressed to itself that has been received from the control station 14, using the main control unit 311, and then executes necessary processing. After a communication connectivity is checked, the control station 14 transmits, in step S505, image processing parameter setting information to the network processing unit 316. In step S506, the image processing parameter setting information is included in a control packet and the control packet is transmitted. In step S507, the main control unit 311 sets the parameter in the image processing unit 314. In step S508, the control station 14 transmits a time synchronization start instruction to the network processing unit 316.

If the network processing unit 316 receives the time synchronization start instruction from the control station 14, the network processing unit 316 issues, in step S509, a time synchronization start instruction to the main control unit 311. In step S510, the main control unit 311 that has received the time synchronization start instruction from the control station 14 via the network processing unit 316 issues a start instruction of time synchronization processing to the synchronization processing unit 313. In step S511, the time server 12 already starts processing as a synchronization source irrespective of the state of the image processing apparatus 100.

Specifically, in the processing, the time server 12 transmits an Announce packet of a PTP packet (time synchronization packet) or a Sync packet to the network processing unit 316. Next, the synchronization processing unit 313 that has received a synchronization processing start instruction from the main control unit 311 transmits a Delay Request packet among PTP packets to the time server 12 via the network processing unit 316. The time server 12 that has received the Delay Request packet from the network processing unit 316 transmits the Delay Response packet to the image processing apparatus 100. In step S512, a series of PTP packet communication is executed. During the PTP packet communication, the synchronization processing unit 313 calculates an offset using a time stamp generated by the network processing unit 316 and transmitted in step S513 and a PTP packet transmitted in step S512, determines a time correction amount based on the offset, and sets time correction information in the system time management unit 312. In step S516, the system time management unit 312 constantly outputs system time information to the reference timing generation unit 304, but in a case where the time correction information is set in step S515, time information following the correction is output. In step S517, the reference timing generation unit 304 outputs a reference timing at a predetermined cycle in response to the input of the system time information received from the system time management unit 312. In step S518, the image capturing control unit 301 that has received the reference timing periodically transmits image capturing control information including an image capturing timing, to the imaging apparatus 11. In step S519, the imaging apparatus 11 that has received the image capturing control information starts image capturing, and outputs image capturing data to the image capturing output unit 302. In step S520, the image capturing data is recorded into the storage device 110 via the image capturing output unit 302. The image capturing data is also input to the input switching unit 305 via the image capturing output unit 302.

In step S521, the control station 14 that has determined that synchronization processing has been completed transmits information regarding mode designation to the network processing unit 316 as mode designation processing. In a case where the real-time reproduction mode is designated, in step S522, information regarding the mode designation is included in a control packet and the control packet is transmitted. The main control unit 311 that has received the control packet designates the real-time reproduction mode in the input switching unit 305. In step S524, the input switching unit 305 that has received the designation starts processing of transmitting image capturing data from the imaging apparatus 11 to the image processing unit 314. In step S523, the main control unit 311 that has received information regarding mode designation performs mode designation also in the reproduction control unit 306. In step S525, the reproduction control unit 306 that has received the mode designation stands by to output a reproduction timing suitable for an image capturing cycle to operate in the real-time reproduction mode. In step S526, after transmitting information regarding mode designation, the control station 14 transmits a real-time reproduction start time to the image processing apparatus 100. In step S527, the network processing unit 316 includes start time information in a control packet and transmits the control packet. In step S528, the main control unit 311 that has received the control packet sets a start time in the reproduction control unit 306. In steps S529 and S530, the reproduction control unit 306 in which the reproduction start time is set monitors system time information to be received and starts output of a reproduction timing from when a time indicated by the system time information has reached the reproduction start time.

Subsequently, the input switching unit 305, the image processing unit 314, and the image output unit 315 perform processing (1) acquisition of image capturing data, (2) image processing of image capturing data, and (3) packetization of image-processed image capturing data in this order using a pipeline operation. In step S531, the image processing unit 314 that has received a reproduction timing executes image processing on image capturing data (a) received immediately before the reproduction timing is received, and outputs image-processed image capturing data at the next reproduction timing. In step S532, the image output unit 315 that has received the image-processed image capturing data (a) transmits the image-processed image capturing data (a) to the network processing unit 316 as an image packet when the next reproduction timing is received. In step S533, the network processing unit 316 performs processing of transmitting an image packet received from the image output unit 315, to the image computing server 13, or processing of transmitting an image packet received from the cable 19a to the image computing server 13.

Figure 5A:
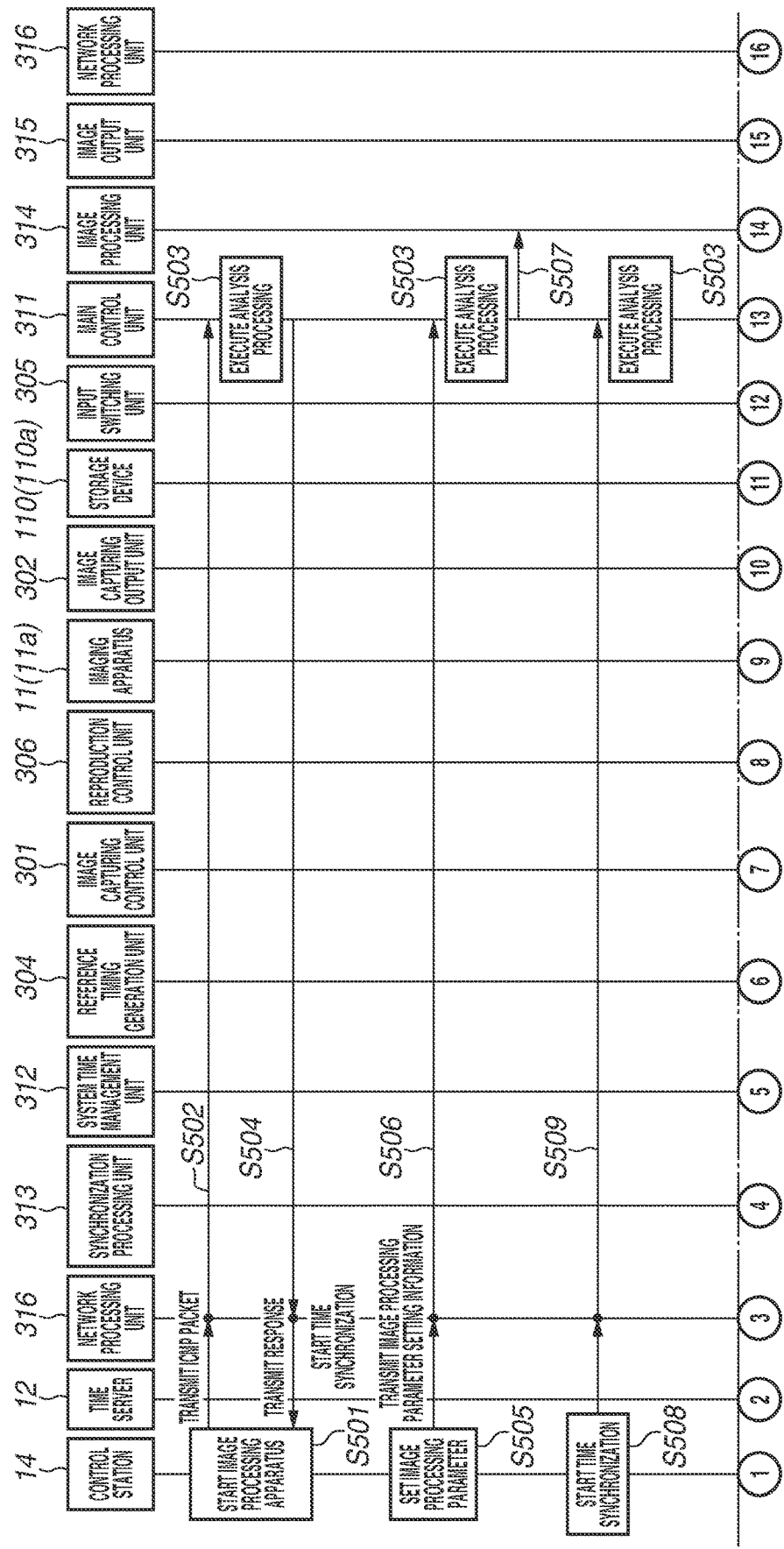

The real-time reproduction mode of the image processing system 1 according to the present exemplary embodiment has been given above with reference to FIGS. 5A to 5C.

Next, an example of an operation of the image processing system 1 in the recording reproduction mode will be described with reference to FIGS. 6A to 6C. Recording data from the storage device 110 is used in the recording reproduction mode, and thus processing on the imaging apparatus 11, the image capturing control unit 301, and the image capturing output unit 302 are not used. On the other hand, processing on the image acquisition unit 303 are not used. The processing up to step S517 in FIGS. 6A to 6B is the same as the processing in FIGS. 5A to 5B, and thus the description will be omitted.

In step S601, the control station 14 that has determined that synchronization processing has been completed transmits information regarding mode designation to the network processing unit 316 as mode designation processing. In a case where the recording reproduction mode is designated, in step S602, the information regarding mode designation is included in a control packet and the control packet is transmitted. The main control unit 311 that has received a control packet designates the recording reproduction mode in the input switching unit 305. In step S604, the input switching unit 305 that has received the designation enters a state of waiting for the reception of input from the storage device 110 (input reception standby state). In step S603, the main control unit 311 that has received information regarding mode designation performs mode designation also in the reproduction control unit 306. In step S605, the reproduction control unit 306 that has received mode designation stands by to output a reproduction timing regarding a recording mode to operate as the recording reproduction mode. In a case where a special reproduction cycle is set, the reproduction control unit 306 enters an output standby state of a reproduction timing suitable for the setting. In step S606, after transmitting information regarding mode designation, the control station 14 designates a time code indicating a period during which recording data is to be reproduced in the recording reproduction mode and transmits the designated time code to the image processing apparatus 100. In step S608, the main control unit 311 sets a start time code and an end time code as required, in the image acquisition unit 303. In step S609, the image acquisition unit 303 identifies recording data to be reproduced first. At this time, the image acquisition unit 303 may preliminarily acquire recording data before a reproduction timing is received. In step S610, the control station 14 transmits a start time of the recording reproduction mode to the image processing apparatus 100 after time code designation. In step S611, the network processing unit 316 includes start time information in a control packet and transmit the control packet. In step S612, the main control unit 311 that has received the start time information performs a start time setting in the reproduction control unit 306. In steps S613 and S614, the reproduction control unit 306 in which the reproduction start time is set monitors system time information to be received and starts output of a reproduction timing from when a time indicated by the system time information has reached the reproduction start time.

Subsequently, the image acquisition unit 303, the input switching unit 305, the image processing unit 314, and the image output unit 315 perform processing in the order of (1) acquisition of image capturing data, (2) transfer of image capturing data to the image processing unit 314, (3) image processing of image capturing data, and (4) packetization of image-processed image capturing data by using a pipeline operation. In step S619, the image acquisition unit 303 that has received a reproduction timing in step S614 acquires recording data (a). In step S620, the image acquisition unit 303 that has received the next reproduction timing in step S615 outputs the recording data (a) to the input switching unit 305. The subsequent processing is the same as that in FIG. 5C.

The recording reproduction mode of the image processing system 1 according to the present exemplary embodiment has been described above with reference to FIGS. 6A to 6C.

According to the above-described image processing system, the image computing server 13 can synchronously acquire a plurality of pieces of image capturing data synchronously captured by a plurality of imaging apparatuses 11 by causing a system to operate in the real-time reproduction mode. On the other hand, the image computing server 13 can synchronously acquire a plurality of pieces of recording data stored in a plurality of storage devices 110 by causing a system to operate in the recording reproduction mode, without performing the preparation of a subject and image capturing processing. That is, the image computing server 13 can generate a virtual viewpoint image regardless of the mode of the system. It is also possible to efficiently operate the present system by causing a system to be operable in the real-time reproduction mode and the recording reproduction mode without reconstruction of the system.

In the above-described exemplary embodiment, the image computing server 13 generates three-dimensional shape data based on image data received from the image processing apparatuses 100, and performs the generation of a virtual viewpoint image, but the configuration is not limited to this. For example, the image computing server 13 may be configured to perform processing up to the generation of three-dimensional shape data to generate a virtual viewpoint image. In this case, in the image processing system 1, processing up to the generation of three-dimensional shape data may be performed, and the three-dimensional shape data may be provided to a third party (e.g., an external server or terminal, a recording medium, such as a universal serial bus (USB)).

The present disclosure can also be implemented by processing of supplying a program implementing one or more functions of the above-described exemplary embodiment, to a system or an apparatus via a network or a storage medium, and one or more processors in a computer of the system or the apparatus reading out and executing a program. In addition, the present disclosure can also be implemented by a circuit (e.g., ASIC) implementing one or more functions.

Without departing from the range of the present disclosure, exemplary embodiments can be freely combined, an arbitrary component in each exemplary embodiment can be modified, or an arbitrary component in each exemplary embodiment can be omitted.

According to an exemplary embodiment of the present disclosure, it is possible to streamline an image processing tuning process in an image processing system including a plurality of imaging apparatuses.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-074879, filed Apr. 28, 2023, which is hereby incorporated by reference herein in its entirety.

What is claimed is:

1. An image processing apparatus that supplies image data to an image processing system configured to process a plurality of pieces of image data that are based on a plurality of pieces of image capturing data, the image processing apparatus comprising:
one or more memories storing instructions; and
one or more processors that, upon execution of the stored instructions, configures the one or more processors to operate as:
a first acquisition unit configured to acquire first image capturing data from an imaging unit configured to capture an image of an image capturing target;
a second acquisition unit configured to acquire second image capturing data from a storage unit storing the second image capturing data captured by the imaging unit;
an image processing unit configured to acquire image data by performing predetermined image processing on the first image capturing data acquired by the first acquisition unit or the second image capturing data acquired by the second acquisition unit in accordance with a setting of a mode; and
an image data transmission unit configured to transmit the image data acquired by the image processing unit to an external device.

2. The image processing apparatus according to claim 1, wherein, in a case where a first mode is set in the image processing apparatus, the image processing unit acquires the image data by performing predetermined image processing on the first image capturing data acquired by the first acquisition unit, and
wherein, in a case where a second mode is set in the image processing apparatus, the image processing unit acquires the image data by performing predetermined image processing on the second image capturing data acquired by the second acquisition unit.

3. The image processing apparatus according to claim 2, wherein execution of the stored instructions further configures the one or more processors to operate as:
a time synchronization unit configured to perform synchronization of time information with the external device;
an image capturing timing generation unit configured to generate an image capturing timing at which the imaging unit captures an image of the image capturing target, based on the time information synchronized by the time synchronization unit; and
an acquisition timing generation unit configured to generate an acquisition timing at which the second acquisition unit acquires the second image capturing data from the storage unit.

4. The image processing apparatus according to claim 3, wherein the image capturing timing generation unit and the acquisition timing generation unit operate in accordance with a mode setting,
wherein, in a case where the first mode is set in the image processing apparatus, the image capturing timing generation unit performs generation of the image capturing timing, and
wherein, in a case where the second mode is set, the acquisition timing generation unit performs generation of the acquisition timing.

5. The image processing apparatus according to claim 4, wherein, in a case where the first mode is set in the image processing apparatus, the image data transmission unit transmits the image data to the external device at a predetermined interval at which the imaging unit performs image capturing.

6. The image processing apparatus according to claim 5, wherein, in a case where the second mode is set in the image processing apparatus, the image data transmission unit transmits the image data to the external device at an interval different from the predetermined interval at which the imaging unit performs image capturing.

7. The image processing apparatus according to claim 6, wherein the first image capturing data and the second image capturing data correspond to data in which captured image data obtained by image capturing performed by the imaging unit and time code information indicating an image capturing time are associated.

8. The image processing apparatus according to claim 7, wherein execution of the stored instructions further configures the one or more processors to operate as a receiving unit configured to receive time code information from an external apparatus, and wherein, in a case where the second mode is set in the image processing apparatus, the second acquisition unit acquires the second image capturing data from the storage unit based on the time code information received by the receiving unit.

9. The image processing apparatus according to claim 8, wherein the predetermined image processing is foreground-background separation processing of extracting image data regarding a foreground in the captured image data.

10. The image processing apparatus according to claim 9, wherein the imaging unit and the storage unit are provided outside the image processing apparatus.

11. The image processing apparatus according to claim 10, wherein, in a case where the first mode is set in the image processing apparatus, the first image capturing data captured by the imaging unit is subjected to the predetermined image processing performed by the image processing unit without the storage unit.

12. A control method of an image processing apparatus configured to supply image data to an image processing system processing a plurality of pieces of image data that are based on a plurality of pieces of image capturing data, the control method comprising:
   acquiring first image capturing data from an imaging unit configured to capture an image of an image capturing target;
   acquiring second image capturing data from a storage unit storing the second image capturing data captured by the imaging unit;
   acquiring image data by performing predetermined image processing on the acquired first image capturing data or the acquired second image capturing data in accordance with a setting of a mode; and
   transmitting the acquired image data to an external device.

13. A non-transitory computer-readable storage medium storing a program for causing a computer to execute a control method of an image processing apparatus configured to supply image data to an image processing system processing a plurality of pieces of image data that are based on a plurality of pieces of image capturing data, the control method comprising:
   acquiring first image capturing data from an imaging unit configured to capture an image of an image capturing target;
   acquiring second image capturing data from a storage unit storing the second image capturing data captured by the imaging unit;
   acquiring image data by performing predetermined image processing on the acquired first image capturing data or the acquired second image capturing data in accordance with a setting of a mode; and
   transmitting the acquired image data to an external device.

14. An image processing system including a plurality of image processing apparatuses, and configured to process a plurality of pieces of image data that are based on a plurality of pieces of image capturing data, each of the plurality of image processing apparatuses including:
   a first acquisition unit configured to acquire first image capturing data from an imaging unit configured to capture an image of an image capturing target;
   a second acquisition unit configured to acquire second image capturing data from a storage unit storing the second image capturing data captured by the imaging unit;
   an image processing unit configured to acquire image data by performing predetermined image processing on the first image capturing data acquired by the first acquisition unit or the second image capturing data acquired by the second acquisition unit in accordance with a setting of a mode; and
   an image data transmission unit configured to transmit the image data acquired by the image processing unit to another image processing apparatus,
   wherein the plurality of image processing apparatuses is connected by daisy-chain connection.

15. An image processing system comprising:
   a plurality of imaging apparatuses for capturing images of an image capturing target region from a plurality of directions;
   a plurality of storage devices configured to store a plurality of pieces of image capturing data captured by the plurality of imaging apparatuses, as a plurality of pieces of recording data;
   a plurality of image processing apparatuses configured to acquire the plurality of pieces of image capturing data from the plurality of pieces of imaging apparatus and acquire a plurality of pieces of image data by performing predetermined image processing on the plurality of pieces of image capturing data acquired from the plurality of imaging apparatuses or the plurality of pieces of recording data acquired from the plurality of storage devices in accordance with a mode setting; and
   an image generation apparatus configured to generate three-dimensional shape data based on the plurality of pieces of image data acquired by the plurality of image processing apparatuses in accordance with a mode setting,
   wherein, in a case where the image processing system operates in a first generation mode, the image processing system generates three-dimensional shape data by using the plurality of pieces of image data acquired by performing predetermined image processing on the plurality of pieces of recording data, and
   wherein, in a case where the image processing system operates in a second generation mode, the image processing system generates three-dimensional shape data by using the plurality of pieces of image data acquired by performing predetermined image processing on the plurality of pieces of image capturing data.

* * * * *